United States Patent
Szuba et al.

(10) Patent No.: US 7,181,820 B2
(45) Date of Patent: Feb. 27, 2007

(54) METHOD AND APPARATUS FOR ORIENTATING A FASTENING ELEMENT

(75) Inventors: Philip S. Szuba, Algonac, MI (US); Mark Collinge, Hildesheim (DE); John R. Leach, Metamora, MI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/156,940

(22) Filed: Jun. 20, 2005

(65) Prior Publication Data

US 2005/0278930 A1 Dec. 22, 2005

Related U.S. Application Data

(60) Provisional application No. 60/582,271, filed on Jun. 22, 2004.

(51) Int. Cl.
*B23Q 3/00* (2006.01)
*B25C 3/00* (2006.01)

(52) U.S. Cl. .......... 29/464; 29/700; 29/525.01; 81/129; 81/44

(58) Field of Classification Search .......... 29/700, 29/715, 809, 813, 812.5, 816, 818, 464, 505, 29/525.01, 525.05, 525.06, 525.11; 81/129, 81/44
See application file for complete search history.

(56) References Cited

U.S. PATENT DOCUMENTS

| 165,725 | A | * | 7/1875 | Glynn | 81/99 |
|---|---|---|---|---|---|
| 377,668 | A | * | 2/1888 | Clark | 81/129 |
| 538,994 | A | * | 5/1895 | Woelfel | 81/405 |
| 562,719 | A | * | 6/1896 | Freeman | 81/382 |
| 601,015 | A | * | 3/1898 | Fitzgerald | 81/126 |
| 612,454 | A | * | 10/1898 | Blackwell | 81/97 |
| 1,417,756 | A | * | 5/1922 | McDonald | 81/357 |
| 1,459,739 | A | * | 6/1923 | Menzl | 81/129 |
| 4,592,136 | A | | 6/1986 | Hirsch | |
| 4,637,284 | A | * | 1/1987 | Rosenbaum | 81/179 |
| 5,181,315 | A | | 1/1993 | Goodsmith | |
| 5,209,144 | A | * | 5/1993 | Lu Guoji | 81/165 |
| 5,653,372 | A | | 8/1997 | Richardson et al. | |
| 6,018,863 | A | | 2/2000 | Altrock | |
| 6,135,933 | A | * | 10/2000 | Kelly et al. | 483/28 |
| 6,415,692 | B1 | | 7/2002 | Klaws | |
| 6,446,330 | B2 | * | 9/2002 | Zieve et al. | 29/788 |
| 7,062,996 | B2 | * | 6/2006 | Johnson | 81/128 |

\* cited by examiner

*Primary Examiner*—Essama Omgba
(74) *Attorney, Agent, or Firm*—Trexler, Bushnell, Giangiorgi, Blackstone & Marr, Ltd

(57) ABSTRACT

A receptacle which is configured to receive a fastener element having a hexagon, or some other polygonal profile, and which is configured to rotationally or angularly orientate the insert fastener element. One version of the receptacle provides that the receptacle is in the open position as a fastener element is dropped therein. Then, a jaw cylinder closes the receptacle, thereby orientating the fastener element. Another version of the receptacle uses springs instead of a jaw cylinder, and orientates the fastener element upon rotation of a threaded shaft of a pulling head.

23 Claims, 7 Drawing Sheets

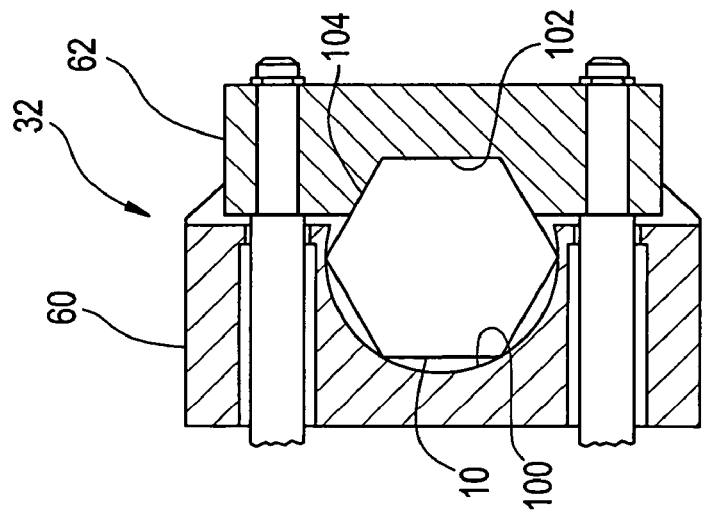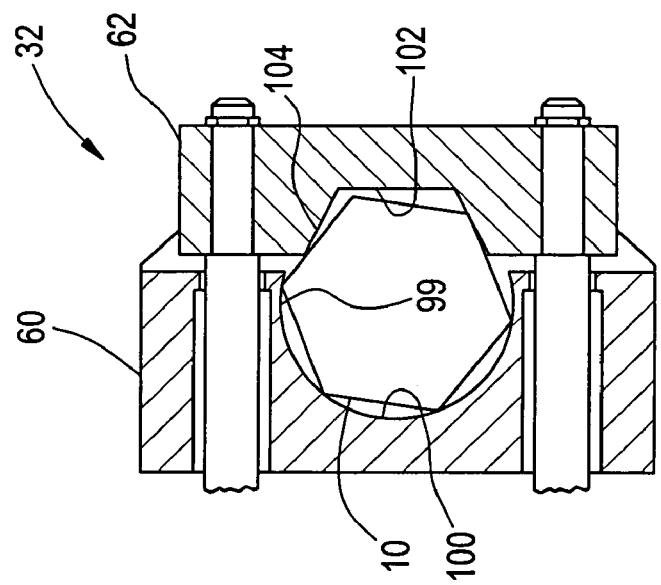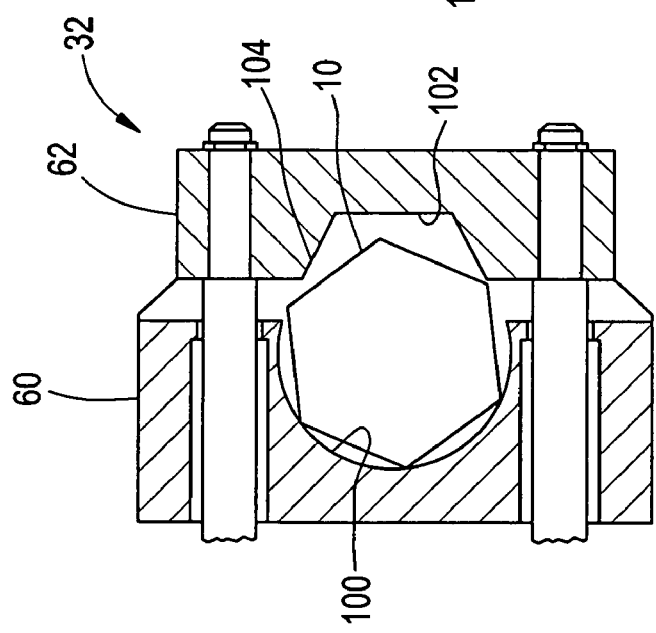

METHOD AND APPARATUS FOR ORIENTATING A FASTENING ELEMENT

RELATED APPLICATION (PRIORITY CLAIM)

This application claims the benefit of U.S. Provisional Application Ser. No. 60/582,271, filed Jun. 22, 2004.

BACKGROUND

This invention generally relates to methods and apparatuses for orientating fastening elements, and more specifically relates to a receptacle having a pocket formed by a plurality of jaws.

In some installation systems, an automatic tool, such as a pulling head, installs fastener elements, such as inserts, in an automated process. One type of insert which is typically installed using a pulling head is illustrated in FIG. 1. As shown, the insert 10 includes an internal throughbore 12 and an external surface 14 which includes a hexagon-shaped (hereinafter "hex-shaped") portion 16 and a round portion 18. A flange 20 is proximate the hex-shaped portion 16. At least a portion of the throughbore 12 is threaded (portion 22 as identified in FIG. 1), proximate the end 24 which is opposite the flange 20. Once the insert 10 is installed in an aperture 11 in a workpiece 13, a threaded fastener is threadable into the insert 10. FIG. 2 illustrates an insert aligned with a corresponding aperture 11 in a workpiece 13, and FIG. 3 illustrates the insert 10 fully installed in the aperture 11 in the workpiece 13.

To install the insert 10, a threaded shaft of the pulling head is inserted into the throughbore 12 at the end 26 of the insert, and is threaded into the threaded portion 22 of the throughbore 12 of the insert 10. Then, the insert 10 is inserted into a workpiece 13 such that the hex-shaped portion 16 of the insert 10 is disposed in a corresponding hex-shaped aperture 11. Once the hex-shaped portion 16 is so positioned, the threaded shaft of the pulling head is actuated to pull up on the threaded portion of the insert, thereby deforming and installing the insert 10 in the workpiece 13. Finally, the threaded shaft of the pulling head is rotated in the opposite direction, thereby causing the pulling head to withdraw from the internal threaded portion 22 of the insert 10. Once fully installed, the insert 10 looks as shown in FIG. 3.

A problem in the art is the difficulty in properly orientating the hex-shaped portion 16 of the insert 10 in relation to a corresponding hex-shaped aperture 11, as shown in FIG. 2. Specifically, oftentimes when the hex-shaped portion 16 of the insert 10 is presented to a corresponding hex-shaped aperture 11 as shown in FIG. 2 (such as in a workpiece or in a device which receives the insert before being engaged by the pulling head and installed in a workpiece), the apexes of the hex-shaped portion 16 of the insert 10 are not properly aligned with apexes of the hex-shaped aperture 11. Currently in the industry, when this happens, the threaded shaft of the pulling head is rotated while the insert is threaded onto the threaded shaft and the insert is engaged or pressed against the work piece at the location of the hex-shaped aperture. Eventually, the rotation of the threaded shaft of the pulling head causes the hex-shaped insert to rotate to a position such that the apexes of hex-shaped portion of the insert become aligned with the hex-shaped aperture, at which time the hex-shaped portion of the insert will enter into the aperture. Thereafter, the insert is deformed and mounted as described above.

This procedure is unreliable and undesirable. The excessive pushing force which is applied to the insert creates reaction forces that often result in other failures, misalignments and possible damage to the surfaces adjacent to the hex-shaped aperture 11. Additionally, the pushing force causes an excessive load to be applied to both the part (i.e., workpiece or a device which receives the insert before being engaged by the pulling head and installed in a workpiece) and the automation equipment (i.e., the pulling head, etc.). Further, the procedure causes excessive wear. Still further, the procedure results in excessive errors due to the insert not being able to be properly orientated (i.e., not falling in the aperture) after several attempts.

OBJECTS AND SUMMARY

An object of an embodiment of the present invention is provide an apparatus and method for orientating a fastener element prior to engagement with the apertured work piece, wherein the apparatus and method do not require excessive force or cause excessive wear.

Another object of an embodiment of the present invention is to provide an apparatus and method for quickly and reliably orientating a fastener element relative to a polygonal shaped opening.

Briefly, and in accordance with at least one of the foregoing objects, an embodiment of the present invention provides a receptacle which is configured to receive an insert having a hexagon, or some other polygonal profile, and which is configured to change the rotational or angular orientation of the insert should the orientation be incorrect. The receptacle includes a pocket which is defined by recesses in a plurality of jaws. Preferably, a pair of jaws is provided with one being stationary and one being moveable, at least one of the jaws being of a shape such that it will engage the hex-shaped or polygonal-shaped insert to produce angular or rotational movement to the desired orientation for insertion into the corresponding shaped opening.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIGS. 7–9 provide sequence views, showing the receptacle closing on an insert, causing the insert to orientate to a desired rotational or angular position;

DESCRIPTION

Figure 2:
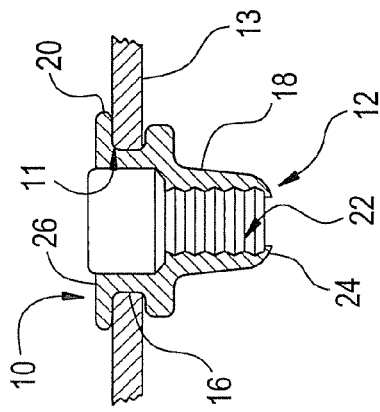
FIG. 2 illustrates a polygonal shaped insert and the corresponding shaped opening into where it is to be installed.

While the present invention may be susceptible to embodiment in different forms, there are shown in the drawings, and herein will be described in detail, specific embodiments thereof with the understanding that the present description is to be considered an exemplification of the principles of the invention and is not intended to limit the invention to that as illustrated and described herein.

Figure 3:
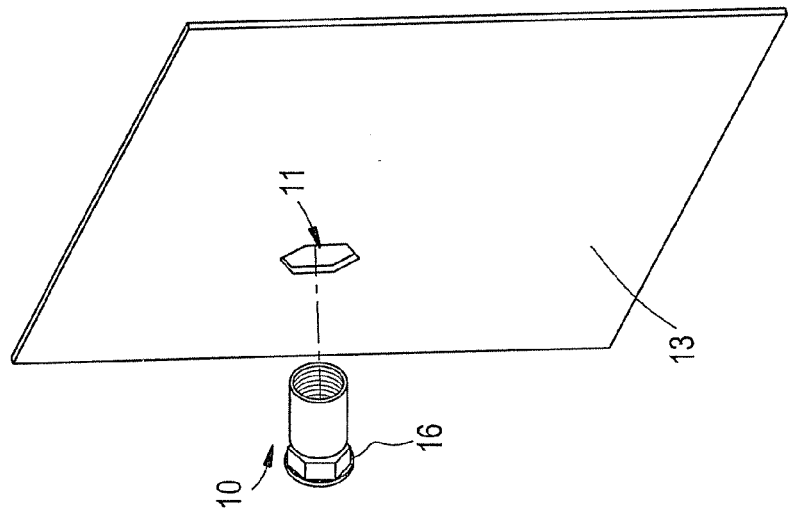
FIG. 3 illustrates the insert of FIGS. 1 and 2 installed in a work piece.
Figure 1:
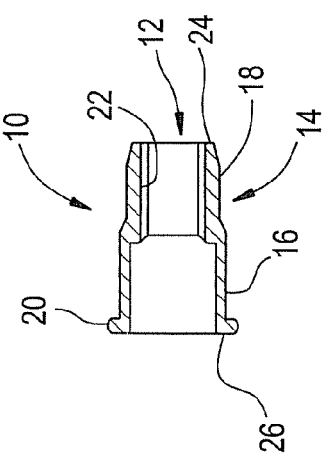
FIG. 1 illustrates in section an insert having a polygonal shaped, specifically a hex-shaped, portion.

An embodiment of the present invention provides a receptacle which is configured to quickly and reliably orientate a fastener element, such as a fastener insert as shown in FIGS. 1 and 2, for disposition or assembly to a similar shaped aperture 11 in a workpiece 13 (as shown in FIG. 3), without requiring excessive force or causing excessive wear.

Figure 4:
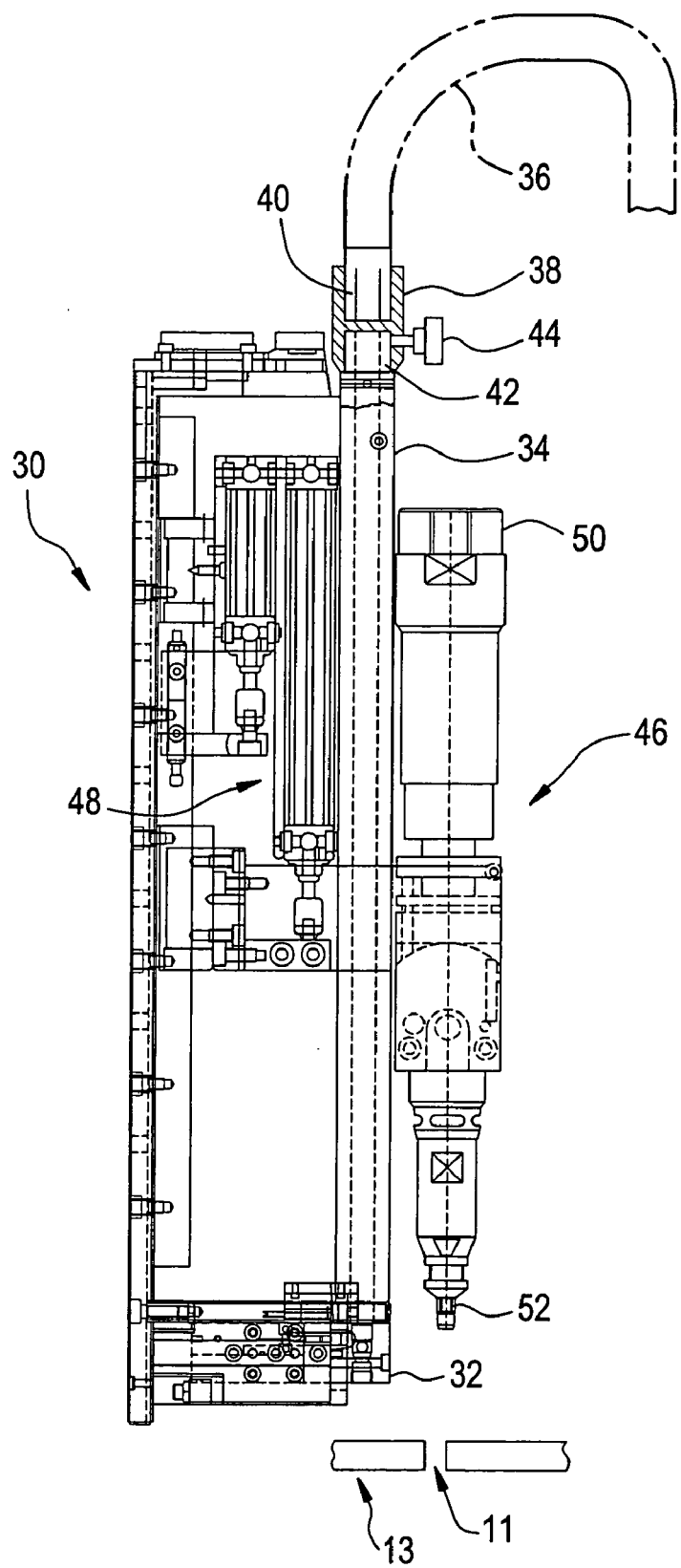
FIG. 4 illustrates a module which is configured to place and set inserts, wherein the module includes a receptacle which is configured to receive and orientate the inserts before being engaged by a pulling head of an automatic tool, and wherein the receptacle is in accordance with an embodiment of the present invention.

FIG. 4 illustrates a setting module 30 which includes a receptacle 32 which is in accordance with an embodiment of the present invention. Other than the receptacle 32, the setting module 30 may be conventional and include a feed tube 34 which is configured to attach to a flexible feed tube 36, where the flexible feed tube 36 air feeds inserts to the feed tube 34 of the setting module 30. Specifically, a connector 38 on the end 40 of the flexible feed tube 36 is configured to engage an end 42 of the feed tube 34. Preferably, the connector 38 includes a retaining screw 44 which can be tightened to secure the connector 38 on the end 42 of the feed tube 34 of the setting module 30. In addition to the feed tube 34, the setting module 30 includes a pulling head 46, as well as means 48 for moving the pulling head 46 up and down, and means 50 for rotating a threaded shaft 52 of the pulling head 46. All this structure, including the pulling head 46, may be conventional. The means 48 for moving the pulling head 46 up and down may be a double acting cylinder, and the means 50 for rotating the threaded shaft 52 of the pulling head 46 may be a pneumatic or hydraulic motor.

Figure 5:
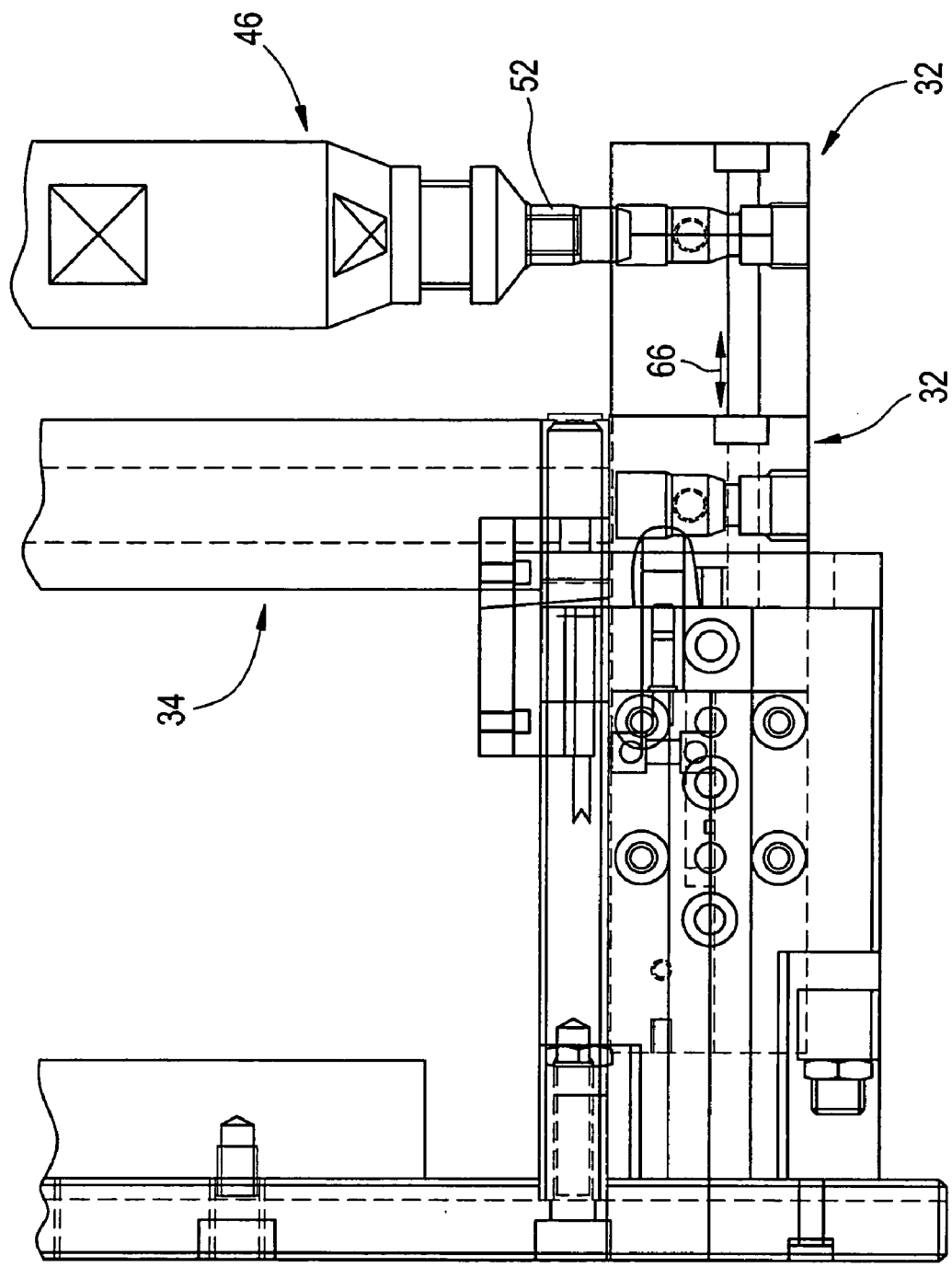
FIG. 5 provides a more detailed view of the receptacle and associated components.

The receptacle 32 which initially receives the insert 10 is shown in more detail in FIGS. 5–9. The receptacle 32 includes a par of jaws 60 and 62 which are configured to selectively open and close (as represented by double arrow 64 in FIG. 6). Additionally, the receptacle 32 is preferably configured to shuttle back and forth from a position under the feed tube 34 of the setting module 30 to a position under the pulling head 46 (said shuttling movement being represented by double arrow 66 in FIGS. 5 and 6). The extended position for the receptacle is also shown in FIG. 5.

Specifically, the receptacle 32 receives an insert 10 (see FIGS. 1 and 2) from the feed tube 34 while the jaws 60 and 62 are open. Then, the jaws 60 and 62 are drawn closer together in order to adjust the rotational or angular orientation of the insert 10. Subsequently, the receptacle 32 shuttles to a position under the pulling head 46 (as shown in FIG. 5), the pulling head 46 is lowered and the threaded shaft 52 of the pulling head 46 is threadedly engaged with the insert 10. Finally, the jaws 60 and 62 of the receptacle 32 open, and the pulling head 46 withdraws or retracts the insert 10 for subsequent installation in a hex-shaped aperture having a corresponding shape. The desired rotational or angular orientation is attained prior to withdrawal by the operation of the jaws 60 and 62 as described hereinafter. The receptacle 32 is configured such that when the pulling head 46 withdraws the insert 10 from the receptacle 32, the insert 10 is correctly rotationally or angularly orientated relative to the hex-shaped aperture 11 (see FIG. 2), such that the insert may be engaged therein without interference. Once the pulling head 46 withdraws the insert 10 from the receptacle 32, the receptacle 32 can shuttle back to the position under the feed tube 34 to receive another insert 10.

After the insert 10 is engaged in the correspondingly shaped aperture 11, the setting module 30 is operated to deform the insert 10, and in effect mount the insert 10 to the workpiece 13, as shown in FIG. 3. The mounting or deforming operation is conventional, and after the insert 10 is deformed to engage the workpiece 13, the setting module 30 disengages from the insert 10 and is retracted to a position for receiving a further insert for assembly to a subsequent hex or polygonal shaped aperture.

As discussed above, the receptacle 32 preferably includes a pair of jaws 60 and 62. More specifically, preferably the receptacle 32 includes a stationary jaw 60 and a moving jaw 62, wherein the stationary jaw 60 remains stationary while the moving jaw 62 moves toward and away from the stationary jaw 60 to close and open, respectively, the receptacle 32. The stationary jaw 60 is connected to the arm 69 of a moving plate 70. Guide pins 72 (preferably two) are received in apertures 74 provided in the jaws, in an idle plate 71 and in an arm of the moving plate. In order to provide a smooth surface resistant to wear, preferably guide bushings 76 (preferably four) are provided in the apertures in the stationary jaw 60 and the arm 69 of the moving plate 70. Preferably, retainer rings 78 function to secure the guide pins 72 at each end.

The idle plate 71 is preferably connected to a jaw cylinder 80 via a rod 82 and a retainer nut 84. The jaw cylinder 80 is configured to move rod 82 back and forth as represented by double arrow 64 in FIG. 4, and therefore move the idle plate 71 and the moving jaw 62 relative to the stationary jaw 60. The jaw cylinder 80 is also attached to the moving plate 70. The moving plate 70 is, in turn, attached to a receptacle slide 90 which is slidable back and forth (as represented by double arrow 64 in FIG. 4) viz-a-viz a receptacle actuator 92 which is affixed to a frame 94, such as via bolts 96. Hence, the jaw cylinder 80 provides for opening and closing of the receptacle 32, and the receptacle actuator 92 provides for shuttling of the receptacle 32 from the feed tube 34 to the pulling head 46, as shown in FIG. 3, and as represented by double arrow 66.

Figure 6:
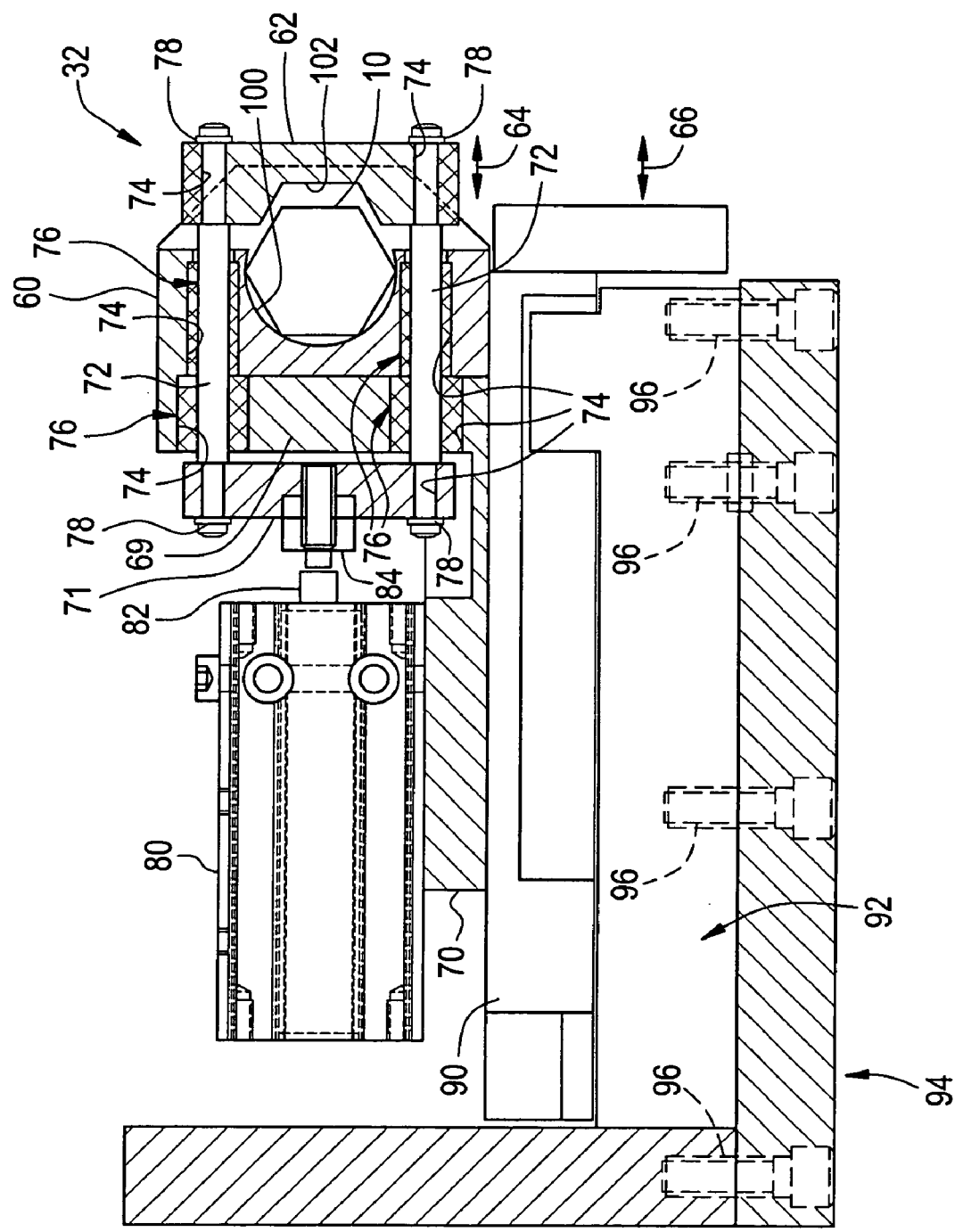
FIG. 6 provides a top view of the receptacle and associated components.

As shown most clearly in FIGS. 5–7, each of the jaws 60 and 62 includes a recess 100 and 102 which provides one half of an insert-receiving pocket 104. In other words, the recesses 100 and 102 effectively mate to form the pocket 104. Preferably, the recess 100 provided in the stationary jaw 60 is in the shape of a semi-circle, while the recess 102 provided in the moving jaw 62 is in the shape of a semi-hexagon (i.e., the shape if formed of three adjacent sides of a hexagon). The jaw cylinder 80 is configured to move the moving jaw 62 relative to the stationary jaw 60, thus opening and closing the pocket 104 defined by the two recesses 100 and 102. The fact that the one recess 100 is provided in the form of a semi-circle and the other recess 102 is provided in the form of a semi-hexagon provides that the pocket 104 tends to engage the insert and orientate a hexagon shaped portion thereof, when the element is positioned in the pocket 104 and the moving jaw 62 is brought toward the stationary jaw 60 (i.e., the pocket 104 is brought closed). As an alternative, it is possible to provide that recess 100 is provided in the form of a semi-hexagon and recess 102 is provided in the form of a semi-circle.

FIGS. 7–9 provide sequence views of the jaws 60 and 62 closing (i.e, the moving jaw 62 being moved toward the stationaly jaw 60), causing the insert 10 disposed in the pocket 104 to become orientated in a desired rotational or angular orientation, more specifically to an orientation corresponding with the semi-hexagon profile of the recess 102 of the moving jaw 62, and therefore also corresponding with the hex-shaped aperture in which the insert 10 is going to be eventually inserted and installed.

Once an insert 10 falls into the pocket 104 from the feed tube 34 (see FIG. 5), the jaw cylinder 80 actuates to bring the moving jaw 62 closer to the stationary jaw 60 as shown in the progression from FIG. 7 to FIG. 8, and from FIG. 8 to FIG. 9. FIG. 7 shows the pocket 104 fully opened (i.e., the moving jaw 62 fully retracted from the stationaly jaw 60) and the insert un-orientated in that the insert 10 has dropped into the pocket 104 from the feed tube 34 and is orientated in whatever position it has landed. Thereafter, the jaw cylinder 80 is actuated to bring the moving jaw 62 toward the stationaly jaw 60 providing engagement with the insert 10, and rotation thereof as indicated by arrow 99, to attain the desired orientation relative to the known orientation of the similar shaped aperture. FIG. 8 shows the pocket 104 partially closed and the insert 10 partially re-orientated, while FIG. 9 shows the pocket 104 fully closed and the insert 10 fully re-orientated.

In operation, the receptacle 32 begins in a position under the feed tube 34 of the setting module 30 (i.e., the left-most position of the receptacle 32 as shown in FIG. 5), in the open position (i.e., the moving jaw 62 is retracted away from the stationary jaw 60) as shown in FIG. 7. Then, an insert 10 (or some other type of fastener element) is blown along the flexible feed tube 36, through the feed tube 34 of the setting module 30, and into the pocket 104 provided in the receptacle 32. Subsequently, the jaw cylinder 80 is actuated to close the pocket 104 as shown in the progression from FIG. 7 to FIG. 8 to FIG. 9. Then, the receptacle actuator 92 is actuated to shuttle the receptacle 32 to a position under the pulling head 46 (i.e., the right-most position of the receptacle 32 as shown in FIG. 5). Subsequently, the pulling head 46 is lowered, and the threaded shaft 52 of the pulling head 46 is inserted into the throughbore 12 proximate the flange 26, and threaded into the threaded portion 22 of the throughbore 12 of the insert 10. Then, the jaw cylinder 80 is actuated to re-open the pocket 104, and the pulling head 46 is lifted up, thereby pulling the insert 10 out of the pocket 104. The receptacle 32 can subsequently be shuttled back to the position under the feed tube 34 (i.e., the left-most position of the receptacle 32 as shown in FIG. 5), and the pulling head 46 can be actuated to install the insert 10 in a correspondingly-shaped aperture 11. To install the insert 10, the pulling head 46 is lowered such that the insert 10 is positioned in the aperture, and then the threaded shaft 52 is retracted, causing the insert 10 to deform and become installed in the workpiece. Finally, the threaded shaft 52 is rotated in the opposite direction to disengage its threads out of the insert 10. FIG. 3 illustrates the insert 10 fully installed.

Figure 10:
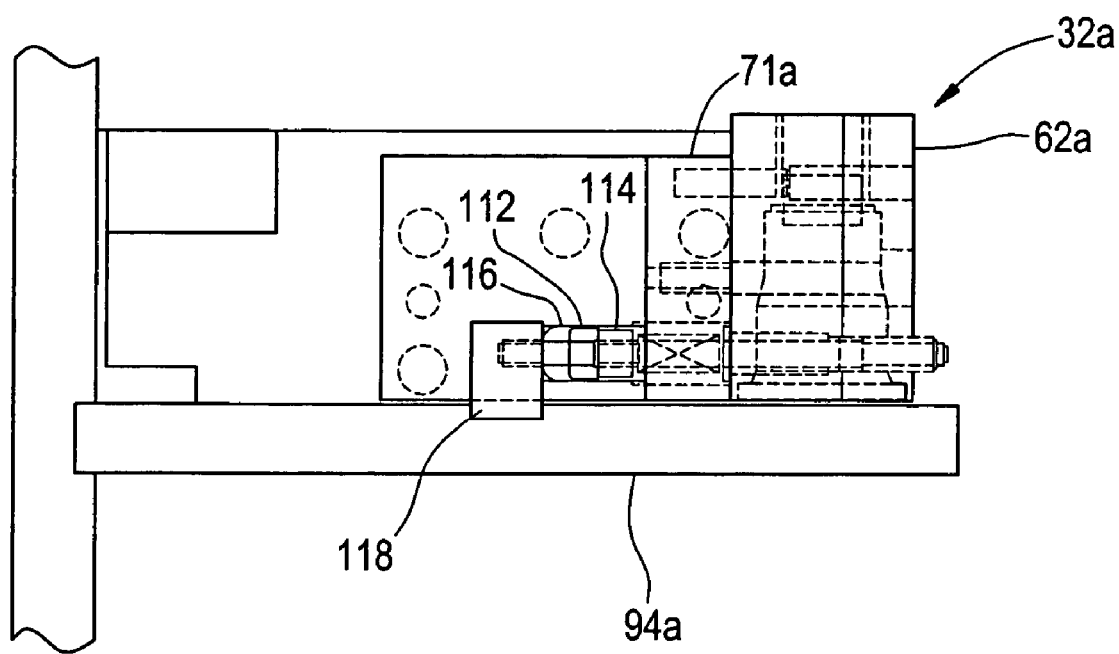
FIG. 10 provides a side view of a receptacle and associated components, wherein the receptacle is in accordance with an alternative embodiment of the present invention.
Figure 11:
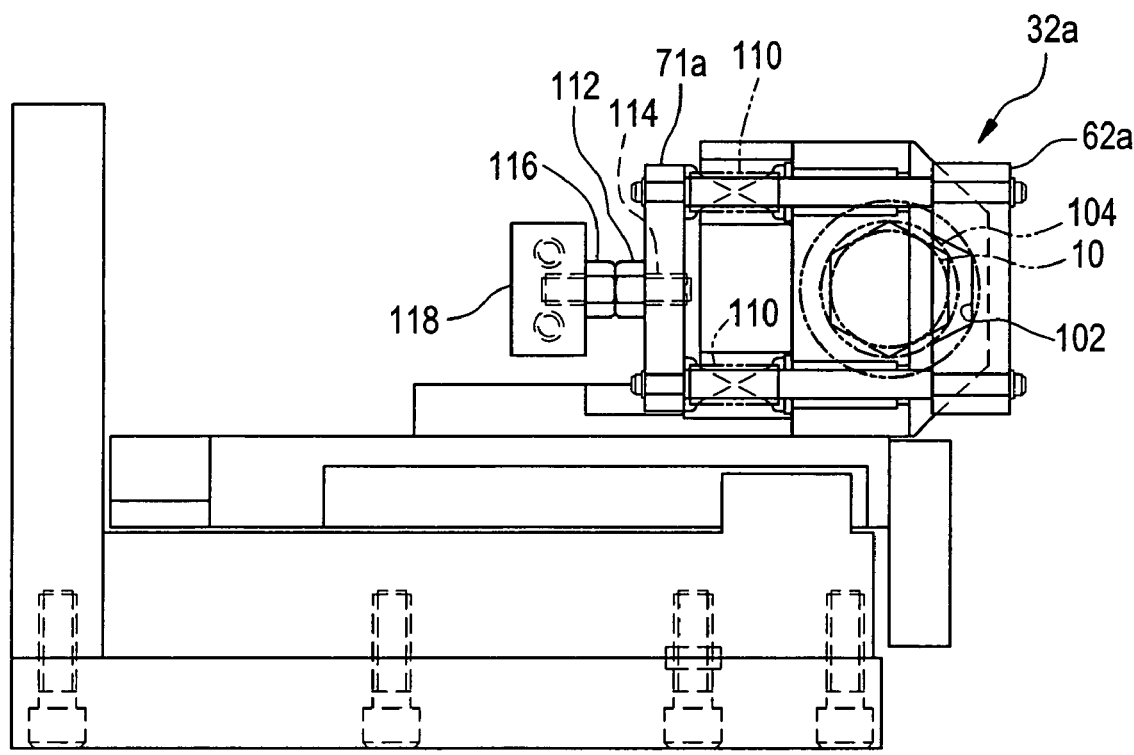
FIG. 11 provides a top view of the receptacle and associated components of FIG. 10.

FIGS. 10 and 11 illustrate an alternative embodiment, wherein a receptacle 32a is provided similar to that shown in FIGS. 4–9, with the exception that the jaw cylinder (part 80 in FIG. 5) is effectively replaced by two compression springs 110. A jaw stop 112 is also provided to keep the springs 110 from excessively closing the moving jaw 62a. The jaw stop 112 may take the form of a bolt 114 attached to the idle plate 71a and a bolt 116 attached to a support arm 118 which is attached to or integral with the frame 94a. In operation, the two bolts 114 and 116 contact each other to prevent over-closing of the moving jaw 62a by the springs 110.

Preferably, the compression springs 110 are configured such that they allow the insert 10 to be fed into the pocket 104 and provide resistance force such that when the threaded shaft 52 of the pulling head 46 begins to rotate and thread into the insert 10, the insert 10 rotates a little in the pocket 104 and pushes on the moving jaw 62a, causing the pocket 104 to open a little more fully, and causing the springs 110 to compress. As the threaded shaft 52 continues to rotate, the insert 10 continues to rotate a little in the pocket 104, and becomes aligned with the semi-hexagon shape of the recess 102. The fact that no jaw cylinder is needed provides cost savings, simplification of set-up and maintenance, and improved reliability.

Regardless, each embodiment provides a receptacle which is configured to quickly and reliably rotationally or angularly orientate a fastener element, such as a fastener insert, without requiring excessive force or causing excessive wear.

It should be understood that the present invention was described and depicted mainly with regard to orientating an insert having a hex-shaped portion relative to a corresponding hex-shaped aperture. However, the present invention can also be used in connection with orientating a fastening element having some other polygonal shape besides hexagon. In such case, the shape of the recess 102 of the moving jaw may have to be revised to correspond with the shape of the fastener element.

While embodiments of the present invention are shown and described, it is envisioned that those skilled in the art may devise various modifications of the present invention without departing from the spirit and scope of the disclosure.

What is claimed is:

1. An apparatus for orientating a fastening element comprising a plurality of jaws, each having a recess which collectively form a pocket for receiving the fastening element, wherein at least one of said jaws is moveable relative to at least one other jaw such that the pocket is closeable on the fastening element, wherein the recess of at least one of the jaws is configured to engage the fastening element and produce rotational movement of the fastening element as the pocket closes on the fastening element, further comprising means to shuttle the jaws back and forth between a device which feeds fastening elements to the pocket and a device which removes fastening elements from the pocket, after a rotational position of the fastening element has been changed by the apparatus.

2. An apparatus as recited in claim 1, wherein the plurality of jaws comprise a pair of jaws, each having a recess which collectively form a pocket.

3. An apparatus as recited in claim 2, wherein one of the jaws is stationaly, and the other jaw is moveable relative to the stationary jaw to effect opening and closing of the pocket.

4. An apparatus as recited in claim 2, wherein one of the jaws has a recess which is semi-circular.

5. An apparatus as recited in claim 2, wherein one of the jaws has a recess which is semi-hexagonal.

6. An apparatus as recited in claim 2, wherein one of the jaws has a recess which is semi-circular and the other jaw has a recess which is semi-hexagonal.

7. An apparatus as recited in claim 2, wherein one of the jaws is stationary, and the other jaw is moveable relative to the stationary jaw to effect opening and closing of the pocket, and wherein the moveable jaw is connected to a cylinder which actuates to move the moveable jaw back and forth.

8. An apparatus as recited in claim 1, wherein at least one of the jaws is spring-biased relative to the at least one other jaw.

9. A method for orientating a fastening element comprising:
providing an apparatus which comprises a plurality of jaws, each having a recess which collectively form a pocket for receiving the fastening element, wherein at least one of said jaws is moveable relative to at least one other jaw such that the pocket is closeable on the fastening element, wherein the recess of at least one of the jaws is configured to engage the fastening element and produce rotational movement of the fastening element as the pocket closes on the fastening element;
positioning the fastening element in the pocket; and
closing the pocket on the fastening element, thereby producing rotational movement of the fastening element in the pocket.

10. A method as recited in claim 9, further comprising providing that the plurality of jaws comprise a pair of jaws, each having a recess which collectively form a pocket.

11. A method as recited in claim 10, further comprising providing that one of the jaws is stationary, and the other jaw is moveable relative to the stationary jaw to effect opening and closing of the pocket.

12. A method as recited in claim 10, further comprising providing that one of the jaws has a recess which is semi-circular.

13. A method as recited in claim 10, further comprising providing that one of the jaws has a recess which is semi-hexagonal.

14. A method as recited in claim 10, further comprising providing that one of the jaws has a recess which is semi-circular and the other jaw has a recess which is semi-hexagonal.

15. A method as recited in claim 10, further comprising providing that one of the jaws is stationary, and the other jaw is moveable relative to the stationary jaw to effect opening and closing of the pocket, further comprising shuttling the jaws back and forth between a device which feeds fastening elements to the pocket and a device which removes fastening elements from the pocket, after a rotational position of the fastening element has been changed by the apparatus.

16. A method as recited in claim 10, further comprising providing that one of the jaws is stationary, and the other jaw is moveable relative to the stationary jaw to effect opening and closing of the pocket, and using a cylinder to move the moveable jaw relative to the stationary jaw.

17. A method as recited in claim 10, further comprising providing that at least one of the jaws is spring-biased relative to the at least one other jaw.

18. A method as recited in claim 9, further comprising shuttling the jaws back and forth between a device which feeds fastening elements to the pocket and a device which removes fastening elements from the pocket, after a rotational position of the fastening element has been changed by the apparatus.

19. A system for orientating a fastening element comprising: an apparatus comprising a plurality of jaws, each having a recess which collectively form a pocket for receiving the fastening element, wherein at least one of said jaws is moveable relative to at least one other jaw such that the pocket is closeable on the fastening element, wherein the recess of at least one of the jaws is configured to engage the fastening element and produce rotational movement of the fastening element as the pocket closes on the fastening element, further comprising a fastener feeding device which feeds fastening elements to the pocket, a fastener removing device which removes fastening elements from the pocket, after a rotational position of the fastening element has been changed by the apparatus, and means to shuttle the jaws back and forth between the fastener feeding device and the fastener removing device.

20. A system as recited in claim 19, wherein the plurality of jaws comprise a pair of jaws, each having a recess which collectively form a pocket.

21. A system as recited in claim 20, wherein one of the jaws is stationary, and the other jaw is moveable relative to the stationary jaw to effect opening and closing of the pocket.

22. A system as recited in claim 20, wherein one of the jaws has a recess which is semi-circular and the other jaw has a recess which is semi-hexagonal.

23. A system as recited in claim 20, wherein one of the jaws is stationary, and the other jaw is moveable relative to the stationaiy jaw to effect opening and closing of the pocket, and wherein the moveable jaw is connected to a cylinder which actuates to move the moveable jaw back and forth.

* * * * *